(12) United States Patent
Yano

(10) Patent No.: US 7,388,636 B2
(45) Date of Patent: Jun. 17, 2008

(54) OPTICAL FILM AND LIQUID CRYSTAL DISPLAY

(75) Inventor: Shuuji Yano, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 251 days.

(21) Appl. No.: 10/531,326

(22) PCT Filed: Sep. 29, 2003

(86) PCT No.: PCT/JP03/12383

§ 371 (c)(1), (2), (4) Date: Apr. 14, 2005

(87) PCT Pub. No.: WO2004/036273

PCT Pub. Date: Apr. 29, 2004

(65) Prior Publication Data

US 2006/0164579 A1    Jul. 27, 2006

(30) Foreign Application Priority Data

Oct. 15, 2002  (JP) .............................. 2002-299938

(51) Int. Cl.
*G02F 1/1335* (2006.01)
(52) U.S. Cl. .................. 349/117; 349/96; 349/118
(58) Field of Classification Search ........ 349/117–119, 349/96
See application file for complete search history.

(56) References Cited

U.S. PATENT DOCUMENTS 6,285,430 B1   9/2001   Saito

2002/0075564 A1   6/2002   Umemoto
2002/0149726 A1*  10/2002  Yano et al. .................. 349/117

FOREIGN PATENT DOCUMENTS

| EP | 1 202 083 A1 | 5/2002 |
|----|--------------|--------|
| JP | 4-305602 | 10/1992 |
| JP | 4-371903 | 12/1992 |
| JP | 11-305217 | 11/1999 |
| JP | 2002-258041 | 9/2002 |

OTHER PUBLICATIONS

European Search Report dated Jul. 20, 2007, issued in corresponding European Patent Application No. 03 80 8892.

* cited by examiner

*Primary Examiner*—Thoi V Duong
(74) *Attorney, Agent, or Firm*—Westerman, Hattori, Daniels & Adrian, LLP.

(57) ABSTRACT

An optical film for a liquid crystal display of the present invention laminating a polarizing plate and a retardation film so that an absorption axis of the polarizing plate and a slow axis of the retardation film are perpendicular or parallel to each other, wherein the polarizing plate comprises a transparent protective film on both surfaces of a polarizer and the transparent protective film has an in-plane retardation $Re_1 = (nx_1 - ny_1) \times d_1$ is 10 nm or less and a thickness direction retardation $Rth = \{(nx_1 + ny_1)/2 - nz_1\} \times d_1$ is in the range of from 30 nm to 100 nm, and the retardation film has an Nz value represented by $Nz = (nx_2 - nz_2)/(nx_2 - ny_2)$ is in the range of from 0.1 to 0.8 and an in-plane retardation $Re_2 = (nx_2 - ny_2) \times d_2$ is in the range of from 60 to 300 nm. The optical film of the invention realizes a high contrast ratio over a wide range and a better view in a case where the optical film is applied to a liquid crystal display driving in IPS mode.

20 Claims, 2 Drawing Sheets

[FIG. 1]
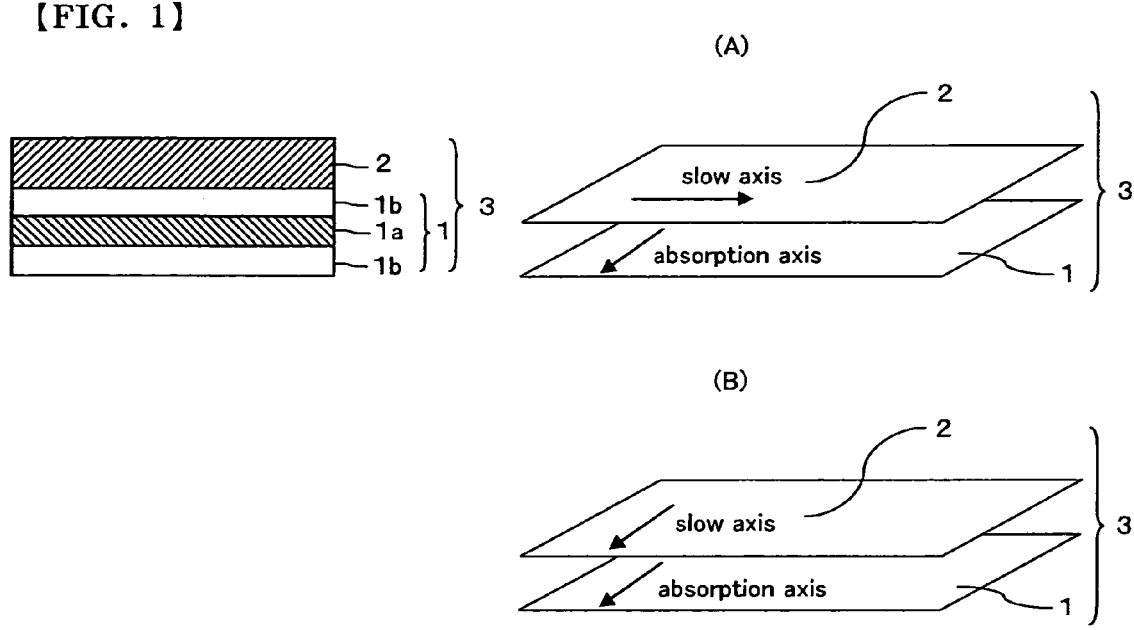
[FIG. 2]
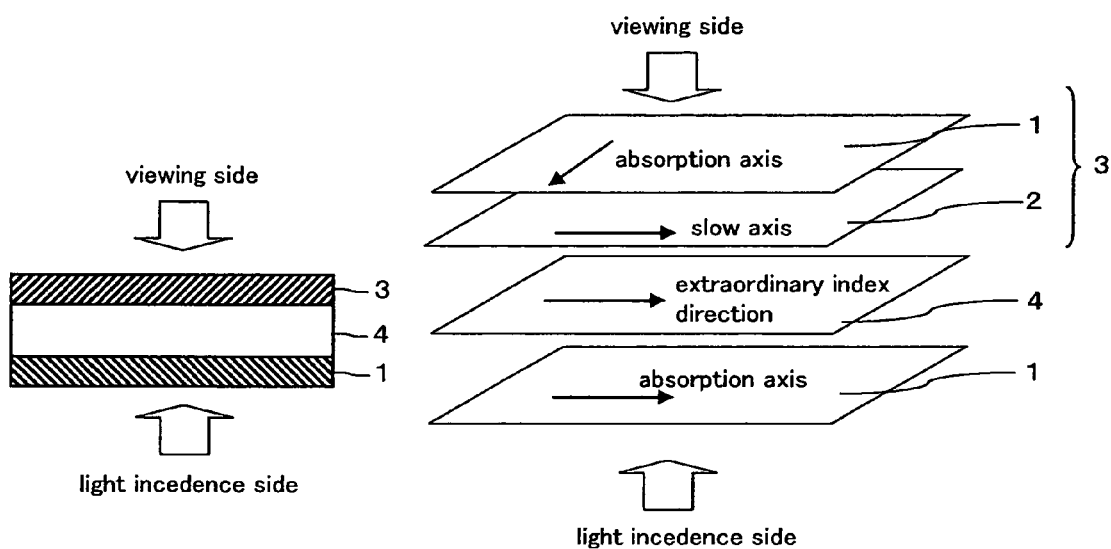

[FIG. 3]
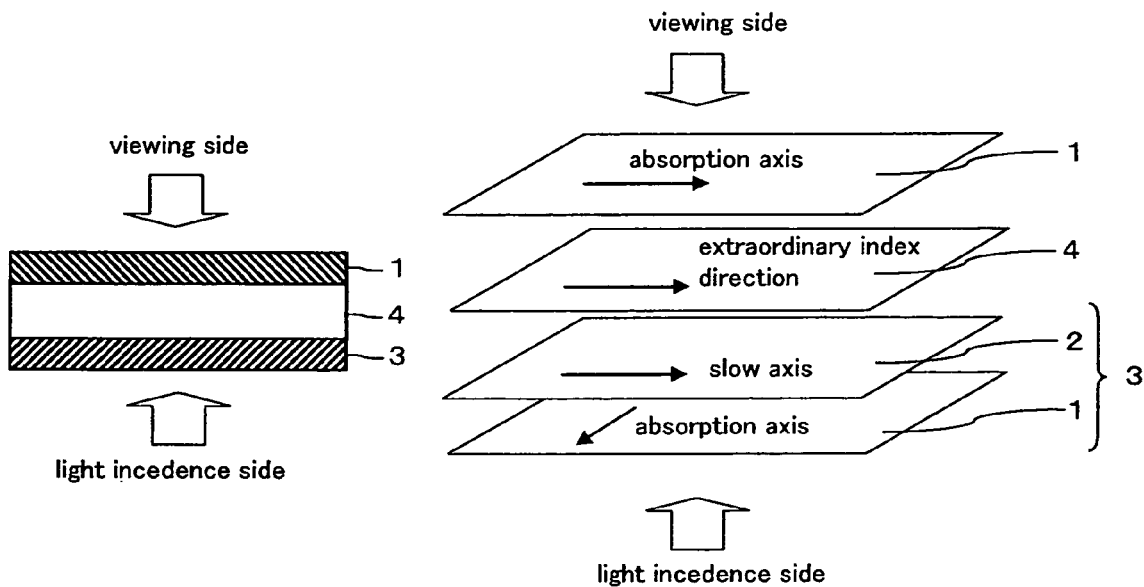
[FIG. 4]
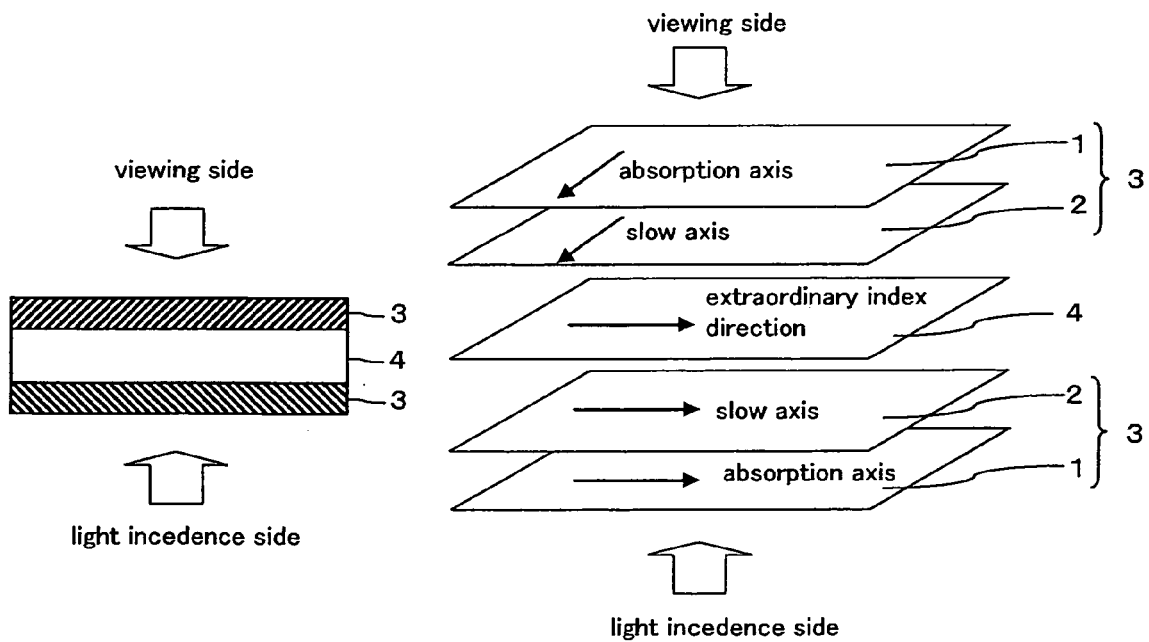

OPTICAL FILM AND LIQUID CRYSTAL DISPLAY

TECHNICAL FIELD

This invention relates to an optical film obtained by laminating a polarizing plate and a retardation film. The optical film of the invention is suited for use in a liquid crystal display driving in IPS mode, and particularly, for use in a transmissive liquid crystal display.

BACKGROUND ART

Conventionally, as a liquid crystal display, there has been used a liquid crystal display in TN mode in which a liquid crystal having a positive dielectric anisotropy is twisted aligned between substrates mutually facing to each other. However, in TN mode, when black view is displayed, optical leakage resulting from birefringence caused by liquid crystal molecule near a substrate made it difficult to obtain perfect display of black color owing to driving characteristics thereof. On the other hand, in a liquid crystal display in IPS mode, since liquid crystal molecule has almost parallel and homogeneous alignment to a substrate surface in non-driven state, light passes through the liquid crystal layer, without giving almost any change to a polarization plane, and as a result, arrangement of polarizing plates on upper and lower sides of the substrate enables almost perfect black view in non-driven state.

Although almost perfect black view may be realized in normal direction to a panel in IPS mode, when a panel is observed in oblique direction, inevitable optical leakage occurs caused by characteristics of a polarizing plate in a direction shifted from an optical axis of the polarizing plates placed on upper and lower sides of the liquid crystal cell, as a result, leading to a problem of narrowing of a viewing angle. That is, in a polarizing plate using a triacetyl cellulose (TAC) film that has been generally used as a protective film, there has remained a problem that a viewing angle is narrowed due to birefringence that the TAC film has.

In order to solve this problem, there has been used a polarizing plate that is compensated a geometric axis shift of a polarizing plate generated when observed in an oblique direction by a retardation film (see, for example, JP-A No. 4-305602 and JP-A No. 4-371903). The retardation film has been used as a protective film for a polarizer in the polarizing plate described in the published Patent Applications. With the retardation film described in the published Patent Applications, however, it is difficult to achieve a sufficiently wide viewing angle in IPS mode liquid crystal display.

DISCLOSURE OF INVENTION

The invention is directed to an optical film comprising a polarizing plate and an retardation film and it is an object of the invention to provide an optical film having a high contrast ratio over a wide range and capable of realizing a better view in a case where the optical film is applied to a liquid crystal display driving in IPS mode.

It is another object of the invention to provide a liquid crystal display, driving in IPS mode, using the optical film and being capable of realizing a better view having a high contrast ratio over a wide range.

The inventors have conducted serious studies in order to solve the above problem and as a result of the studies, have found an optical film shown below, which has led to completion of the invention.

That is, the present invention related to an optical film for a liquid crystal display obtained by laminating a polarizing plate and a retardation film so that an absorption axis of the polarizing plate and a slow axis of the retardation film are perpendicular or parallel to each other, wherein the polarizing plate comprises a transparent protective film on both surfaces of a polarizer and if a direction on the transparent protective film in which an in-plane refractive index is maximized is X axis, a direction perpendicular to X axis is Y axis, a direction of the film thickness is Z axis; and refractive indexes at 550 nm in the respective axes directions are $nx_1$, $ny_1$ and $nz_1$; and a thickness of the film is $d_1$ (nm) by definition, an in-plane retardation $Re_1=(nx_1-ny_1)\times d_1$ is 10 nm or less and a thickness direction retardation $Rth=\{(nx_1+ny_1)/2-nz_1\}\times d_1$ is in the range of from 30 nm to 100 nm, and wherein if a direction on the retardation film in which an in-plane refractive index is maximized is X axis, a direction perpendicular to X axis is Y axis, a direction perpendicular to X axis is Y axis, a direction of the film thickness is Z axis; and refractive indexes at 550 nm in the respective axes directions are $nx_2$, $ny_2$ and $nz_2$; and a thickness of the film is $d_2$ (nm) by definition, the following relations are satisfied:

an Nz value represented by $Nz=(nx_2-nz_2)/(nx_2-ny_2)$ is in the range of from 0.1 to 0.8 and an in-plane retardation $Re_2=(nx_2-ny_2)\times d_2$ is in the range of from 60 to 300 nm.

An optical film of the invention can prevent light leakage in a direction deviated from an optical axis with the specific retardation film in a case where a polarizing plate having a protective film with prescribed retardation values is arranged in the cross-Nichols positional relation and, for example, can be preferably employed in IPS mode liquid crystal display. The optical film of the invention has especially a function compensating reduction in contrast in a liquid crystal layer in an oblique direction. The optical film is a laminate obtained by laminating a polarizing plate and a retardation film so that the absorption axis of the polarizing plate and the slow axis of the retardation film are perpendicular to each other.

A transparent protective film of the polarizing plate has an in-plane retardation $Re_1$ of 10 nm or less and preferably 6 nm or less, while has a thickness direction retardation Rth in the range of 30 to 100 nm and preferably in the range from 30 to 60 nm. The invention is to obtain an optical film high in compensation effect using a retardation film in a case of using a transparent protective film for a polarizer having such retardations. No specific limitation is imposed on a thickness of the transparent protective film $d_1$ and the thickness has a value generally 500 μm or less and preferably in the range of from 1 to 300 μm. The thickness is especially preferably in the range of from 5 to 200 μm.

The Nz value of the retardation film is in the range of from 0.1 to 0.8 and the in-plane retardation $Re_2$ is in the range of 60 to 300 nm. The Nz value is preferably 0.2 or more and more preferably 0.25 or more from the standpoint of enhancement in compensation function. On the other hand, the Nz value is preferably 0.6 or less and more preferably 0.55 or less from the standpoint of enhancement in compensation function. The in-plane retardation $Re_2$ is preferably 123 nm or more and more preferably 128 nm or more from the standpoint of enhancement in compensation function. While the optical film of the invention is employed in, for example, an IPS mode liquid crystal display, the in-plane retardation $Re_2$ of the retardation film is preferably in the range of from 100 to 160 nm in a case where the optical film is used only on one side of the liquid crystal cell in mode liquid crystal display. In this case, the in-plane retardation $Re_2$ is more preferably 150 nm or less and further more preferably 145 nm or less. Note that in a case where the optical films are disposed on both sides of a liquid crystal cell in IPS mode liquid crystal display, the retardation film used in the optical film disposed on the light incidence side, as described later, is preferably smaller in in-plane retardation $Re_2$ than the retardation film used in the optical film disposed on the viewing side. No specific limitation is placed on a thickness $d_2$ of the retardation film, the thickness $d_2$ of the retardation film is usually in the range of from about 40 to 100 μm and preferably in the range of from 50 to 70 μm.

The optical film is preferably employed in IPS mode liquid crystal display using an IPS mode liquid crystal cell having a retardation value in the range of from 230 nm to 360 nm at 550 nm when no voltage is applied.

The optical film of the invention is preferably applied to an IPS mode liquid crystal display. No specific limitation is imposed on a particular material as a material applying a liquid crystal cell in IPS mode and one of materials that have been usually used can be properly selected for use, while the optical film of the invention is preferable in that application to a liquid crystal cell having a retardation value in the range of from 230 nm to 360 nm at 550 nm when no voltage is applied can preferably impart a compensation function due to the retardation film to thereto. A retardation value of a liquid crystal cell at 550 nm when no voltage is applied is preferably in the range of from 230 to 360 nm and more preferably in the range of from 250 to 280 nm.

And the present invention related to a transmissive liquid crystal display comprising: a liquid crystal cell containing a pair of substrates between which a liquid crystal layer is sandwiched, and driven in IPS mode; and a pair of polarizing plates disposed on both sides of the liquid crystal cells so that an absorption axis of the polarizing plates are perpendicular to each other, wherein at least one of the polarizing plates is the above mentioned optical film, and the optical film is disposed so that a retardation film sides face the liquid crystal cell.

In a case where an optical film described above is disposed only on a cell substrate on the viewing side in the transmissive liquid crystal display, it is preferable to adjust an extraordinary index direction of a liquid crystal material in the liquid crystal cell when no voltage is applied and an absorption axis of the polarizing plate on the light incidence side to be parallel to each other.

In a case where an optical film described above is disposed only on a cell substrate on the light incidence side in the transmissive liquid crystal display, it is preferable to adjust an extraordinary index direction of a liquid crystal material in the liquid crystal cell when no voltage is applied and an absorption axis of the polarizing plate in the optical film to be perpendicular to each other.

In the case where the optical film is disposed on the cell substrate on the viewing side or the light incidence side, it is preferable to use the optical film obtained by laminating a polarizing plate and a retardation film to each other so that an absorption axis of the polarizing plate and a slow axis of the retardation film is perpendicular to each other from the standpoint of reduction in influence of dispersion in the retardation film used for controlling polarization.

In a case where optical films described above are disposed on the cell substrates on the viewing side and the light incidence side in the transmissive liquid crystal display, it is preferable to adjust an extraordinary index direction of a liquid crystal material in the liquid crystal cell when no voltage is applied and an absorption axis of the polarizing plate in the optical film on the light incidence side to be parallel to each other.

In a case where the optical films are disposed on the cell substrates on the viewing side and the light incidence side, it is preferable to use the optical film obtained by laminating the polarizing plate and a retardation film to each other so that an absorption axis of the polarizing plate and a slow axis of the retardation film are parallel to each other from the standpoint of reduction in influence of dispersion in the retardation film used for controlling polarization.

In this case, an in-plane retardation value $Re_2$ of the retardation film in the optical film disposed on the cell substrate on the light incidence side is preferably smaller than an in-plane retardation value $Re_2$ of the retardation film in the optical film disposed on the cell substrate on the viewing side.

In an IPS mode liquid crystal display of the invention, an optical film of the invention obtained by laminating a polarizing plate and a retardation film is disposed on one of the surfaces of an IPS mode liquid crystal cell or the optical films of the inventions obtained by the same process are disposed on both surfaces thereof to thereby enable light leakage on black view to be reduced that has been conventionally encountered in IPS mode liquid crystal display. Such an IPS mode liquid crystal display has a high contrast ratio over all azimuth angles, thereby enabling a display easy to be viewed in a wide viewing angle to be achieved.

BRIEF DESCRIPTION OF DRAWING

FIG. 1 is an example showing sectional representations of an optical film of the invention.

FIG. 2 is conceptual representations of a liquid crystal display of the invention.

FIG. 3 is conceptual representations of a liquid crystal display of the invention.

FIG. 4 is conceptual representations of a liquid crystal display of the invention.

BEST MODE FOR CARRYING OUT OF THE INVENTION

Description will be given of an optical film and an image display of the invention with reference to the accompanying drawing. An optical film 3 of the invention is, as shown in FIG. 1, a laminate obtained by laminating a retardation film 2 onto a polarizing plate 1. The polarizing plate 1 that is used is a laminate obtained by laminating a transparent protective film 1b on both surfaces of a polarizer 1a. It is an example in which a retardation film 2 is laminated onto one surface thereof. The polarizing plate 1 and the retardation film 2 are laminated one on the other so that an absorption axis of the polarizing plate 1 and a slow axis of the retardation film 2 are perpendicular or parallel to each other. FIG. 1(A) shows a case where the absorption axis of the polarizing plate 1 and the slow axis of the retardation film 2 are laminated so as to be perpendicular to each other. FIG. 1(B) shows a case where the absorption axis of the polarizing plate 1 and the slow axis of the retardation film 2 are laminated so as to be parallel to each other.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type orientation films, such as dehydrated polyvinyl alcohol and dehydrochlorinated polyvinyl chloride, etc. may be mentioned. In these, a polyvinyl alcohol type film on which dichromatic materials such as iodine is absorbed is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

Any of transparent protective films employed on the polarizer can be used without any particular limitation thereon, as far as an in-plane retardation $Re_1$ thereof is 10 nm or less and a thickness direction retardation Rth is in the range of from 30 to 100 nm. Examples of materials forming such a transparent protective film include: for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. In addition, a film comprising resins of heat curing type or ultraviolet curing type, such as acrylics type, urethane type, acrylics urethane type and epoxy type and silicone type may be mentioned. As a material of the transparent protective film, preferable is triacetyl cellulose generally used as a transparent protective film for a polarizer. Transparent protective films can be suitably stretched so as to obtain an in-plane retardation $Re_1$ in the range and a thickness direction retardation Rth in the range.

As the opposite side of the polarizing-adhering surface above-mentioned protective film, a film with a hard coat layer and various processing aiming for antireflection, sticking prevention and diffusion or anti glare may be used.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight part to the transparent resin 100 weight part that forms the fine concavo-convex structure on the surface, and preferably 5 to 25 weight part. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective layer.

Isocyanate based adhesives, polyvinyl alcohol based adhesives, gelatin based adhesives, vinyl based latex based, aqueous polyester based adhesives, and etc. may be used for adhesion processing for the above-mentioned polarizers and transparent protective films.

Any of retardation films can be employed without any particular limitation thereon, as far as an Nz value is in the range of from 0.1 to 0.8 and an in-plane retardation value $Re_2$ is in the range of from 60 to 300 nm. Examples of retardation films include: a birefringent film made from a polymer film; an alignment film made from a liquid crystal polymer and others.

Among polymers are, for example: polycarbonate; polyolefins, such as and polypropylene; polyesters, such as polyethylene terephthalate and polyethylenenaphthalate; cycloaliphatic polyolefins, such as poly norbornene etc.; polyvinyl alcohols; polyvinyl butyrals; polymethyl vinyl ethers; poly hydroxyethyl acrylates; hydroxyethyl celluloses; hydroxypropyl celluloses; methylcelluloses; polyallylates; polysulfones; polyether sulfones; polyphenylene sulfides; polyphenylene oxides; poly allyl sulfones; polyvinyl alcohols; polyamides; polyimides; polyvinyl chlorides; cellulose based polymers; or various kinds of binary copolymers; ternary copolymers; and graft copolymers of the above-mentioned polymers; or their blended materials. A retardation film may be obtained by adjusting a refractive index in a thickness direction using a method in which a polymer film is biaxially stretched in a planar direction, or a method in which a high polymer film is uniaxially or biaxially stretched in a planar direction, and also stretched in a thickness direction etc. And a retardation film may be obtained using, for example, a method in which a heat shrinking film is adhered to a polymer film, and then the combined film is stretched and/or shrunken under a condition of being influenced by a shrinking force to obtain tilted orientation.

As liquid crystalline polymers, for example, various kinds of principal chain type or side chain type polymers may be mentioned in which conjugated linear atomic groups (mesogen) demonstrating liquid crystal alignment property are introduced into a principal chain and a side chain of the polymer. As illustrative examples of principal chain type liquid crystalline polymers, for example, nematic orientated polyester based liquid crystalline polymers having a structure where mesogenic group is bonded by a spacer section giving flexibility, discotic polymers, and cholesteric polymers, etc. may be mentioned. As illustrative examples of side chain type liquid crystalline polymers, there may be mentioned a polymer having polysiloxanes, polyacrylates, polymethacrylates, or poly malonates as a principal chain skeleton, and having a mesogen section including a para-substituted cyclic compound unit giving nematic orientation through a spacer section comprising conjugated atomic group as side chain. As preferable examples of oriented films obtained from these liquid crystalline polymers, there may be mentioned a film whose surface of a thin film made of polyimide or polyvinyl alcohol etc. formed on a glass plate is treated by rubbing, and a film obtained in a method that a solution of a liquid crystalline polymer is applied on an oriented surface of a film having silicon oxide layer vapor-deposited by an oblique vapor deposition method and subsequently the film is heat-treated to give orientation of the liquid crystal polymer, and among them, a film given tilted orientation is especially preferable.

A laminating method for the above-mentioned retardation films and polarizing plates is not especially limited, and lamination may be carried out using pressure sensitive adhesive layers etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

In addition, ultraviolet absorbing property may be given to the above-mentioned each layer, such as an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An optical film of the present invention is suitably used for a liquid crystal display in IPS mode. A liquid crystal display in IPS mode has a liquid crystal cell comprising: a pair of substrates sandwiching a liquid crystal layer; a group of electrodes formed on one of the above-mentioned pair of substrates; a liquid crystal composition material layer having dielectric anisotropy sandwiched between the above-mentioned substrates; an orientation controlling layer that is formed on each of surfaces, facing each other, of the above-mentioned pair of substrates in order to orient molecules of the above-mentioned liquid crystal composition material in a predetermined direction, and driving means for applying driver voltage to the above-mentioned group of electrodes. The above-mentioned group of electrodes has alignment structure arranged so that parallel electric field may mainly be applied to an interface to the above-mentioned orientation controlling layer and the above-mentioned liquid crystal composition material layer. The liquid crystal cell has preferably a retardation value in the range of 230 to 360 nm at 550 nm when no voltage is applied, which has been described above.

An optical film 3 of the invention is disposed on at least one of the viewing side and the light incidence side of a liquid crystal cell. FIG. 2 shows a case where the optical film 3 is disposed on the viewing side, while FIG. 3 shows a case where the optical film 3 is disposed on the light incidence side. FIG. 4 shows a case where the optical films 3 are disposed on the viewing side and the light incidence side, respectively. The optical film or optical films 3 are as shown in FIGS. 2 to 4 preferably disposed so as to place a retardation film or retardation films face the liquid crystal cell 4.

In FIGS. 2 and 3, the optical film 3 is a laminate obtained by laminating the polarizing plate 1 and the retardation film 2 so that the absorption axis of the polarization plate 1 and the slow axis of the retardation film 2 are perpendicular to each other. The polarizing plate 1 is disposed on the other side of the liquid cell 4 from the optical film 3 disposed thereon. The absorption axes of the polarizing plates 1 and the optical films 3 (the polarizing plate 1) on substrates of the liquid crystal cell 4 at both sides thereof are disposed so as to be perpendicular to each other. The polarizing plate 1 adhered alone is a laminate obtained by laminating a transparent protective film 2b on both surfaces of a polarizer 1a that is similar to that used in the optical film 3.

In the case where the optical film 3 is, as shown in FIG. 2, disposed on the viewing side of the liquid cell 4 in IPS mode, it is preferable to dispose a polarizing plate 1 on the substrate of the liquid crystal cell 4 on the other side (light incidence side) thereof from the viewing side so that an extraordinary index direction of a liquid crystal material In the liquid crystal cell 4 when no voltage is applied and the absorption axis of the polarizing plate 1 therein are parallel to each other.

In the case where the optical film 3 is, as shown in FIG. 3, disposed on the light incidence side of the liquid cell 4 in IPS mode, it is preferable to dispose a polarizing plate 1 on the substrate of the liquid crystal cell 4 on the viewing thereof so that an extraordinary index direction of a liquid crystal material in the liquid crystal cell 4 when no voltage is applied and the absorption axis of the polarizing plate 1 in the optical film 3 are perpendicular to each other.

In the case of FIG. 4 where the optical films 3 are laminates each obtained by laminating a polarizing plate 1 and a retardation film 2 so that the absorption axis of the polarizing plate 1 and the slow axis of the retardation film 2 are parallel to each other. The absorption axes of the optical films 3 (the polarizing plates 1) disposed on respective both sides of the liquid crystal cell 4 at the substrates thereof are arranged to be perpendicular to each other. In the case where the optical films 3 are, as shown in FIG. 4, disposed on respective both sides of the liquid crystal cell 4 in IPS mode, it is preferable to dispose the optical films 3 on respective both sides of the liquid crystal 4 so that an extraordinary index direction of a liquid crystal material in the liquid crystal cell 4 when no voltage is applied and the absorption axis of the polarizing plate 1 in the optical film 3 on the light incidence side are parallel to each other.

The above-mentioned optical film and polarizing plate may be used in a state where other optical films are laminated thereto on the occasion of practical use. The optical films used here are not especially limited, and, for example, one layer or two or more layers of optical films that may be used for formation of liquid crystal displays, such as reflectors, semitransparent plates, and retardation plates (including half wavelength plates and quarter wavelength plates etc.) may be used. Especially, a polarizing plate in which a brightness enhancement film is further laminated to a polarizing plate is preferable.

The polarizing plate on which the retardation plate is laminated may be used as elliptically polarizing plate or circularly polarizing plate. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called $\lambda/4$ plate) is used. Usually, half-wavelength plate (also called $\lambda/2$ plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy (D-BEF and others manufactured by 3M Co., Ltd.); an oriented film of cholesteric liquid-crystal polymer; a film that has the characteristics of reflecting a circularly polarized light with either left-handed or right-handed rotation and transmitting other light, such as a film on which the oriented cholesteric liquid crystal layer is supported (PCF350 manufactured by Nitto Denko CORPORATION, Transmax manufactured by Merck Co., Ltd., and others); etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transreflective type polarizing plate is combined with above described retardation plate respectively.

Although optical films and polarizing plates having the above-mentioned optical films laminated thereto may be formed using methods in which they are laminated sequentially and separately in a manufacturing process of liquid crystal displays, films that are beforehand laminated and constituted as an optical film are superior in stability of quality, assembly work, etc., thus leading to advantages of improved manufacturing processes for liquid crystal displays. Suitable adhering means, such as adhesive layer, may be used for lamination for layers. In adhesion of the above-mentioned polarizing plate and other optical films, the optical axes may be arranged so that they have proper arrangement angles based on desired retardation characteristics etc.

Formation of a liquid crystal display may be carried out according to conventional methods. A liquid crystal display is generally formed using methods in which component parts, such as lighting systems, are suitably assembled, and driving circuits are subsequently incorporated, if necessary, and the present invention is not especially limited except that the above-mentioned optical film is used, and any methods according to conventional methods may be adopted. Also in liquid crystal cells, for example, liquid crystal cells of arbitrary type, such as VA type and π type, other than IPS mode type illustrated above may be used.

As liquid crystal displays, suitable liquid crystal displays, such as types using lighting systems or reflectors, may be formed. Furthermore, on the occasion of formation of liquid crystal displays, one layer of two or more layers of suitable parts, such as diffusion plates, anti-glare layer coatings, protective plates, prism arrays, lens array sheets, optical diffusion plates, and backlights, may be arranged in suitable position.

EXAMPLES

While description will be given of the invention in a concrete manner with examples, it should be noted that the invention is not limited by description in the examples.

Refractive indexes nx, ny and nz of a transparent protective film at 550 nm were firstly measured with an automatic birefringence analyzer KOBRA-21ADH, manufactured by Oji Scientific Instruments and thereafter, an in-plane retardation $Re_1$ and a thickness direction retardation Rth were calculated. Similar measurement was conducted on a retardation film and an Nz value and an in-plane retardation $Re_2$ were calculated. A retardation value of a liquid crystal cell at 550 nm when no voltage is applied was measured with the Senarmont method.

Example 1

Preparation of Polarizing Plate

Triacetyl cellulose (TAC) films (transparent protective films with a thickness of 80 μm) were laminated onto respective both surfaces of films (a polarizer with a thickness of 20 μm) obtained by stretching a polyvinyl alcohol film to which iodine had been adsorbed, using an adhesive. A TAC film has an in-plane retardation $Re_1$ of 4 nm and a thickness direction retardation Rth of 50 nm.

Optical Film

A polycarbonate film was stretched to obtain a retardation film having a thickness of 45 μm, an in-plane retardation $Re_2$ of 140 nm and Nz of 0.5. The retardation film and the polarizing plate were laminated one on the other with a pressure sensitive adhesive so that an slow axis of the retardation film and an absorption axis of the polarizing plate were perpendicular to each other to thereby prepare an optical film.

Liquid Crystal Display

A liquid crystal cell in IPS mode with a retardation value of 280 nm at 550 nm was employed and the optical film was, as shown in FIG. 3, laminated onto one side of the liquid crystal cell in IPS mode with a pressure sensitive adhesive so that the retardation film side of the optical film face a surface of the liquid crystal cell in IPS mode on the light incidence side. On the other hand, the polarizing plate was laminated onto the surface of the other side of the liquid crystal cell with a pressure sensitive adhesive to thereby prepare a liquid crystal display. Lamination was conducted so that the absorption axis of the polarizing plate (the optical film) on the light incidence side and an extraordinary index direction of a liquid crystal in the liquid crystal cell were perpendicular to each other. A slow axis of the retardation film (the optical film) was parallel to the absorption axis of the polarizing plate on the viewing side. The absorption axis of the polarizing plate (the optical film) on the light incidence side was perpendicular to the absorption axis of the polarizing plate on the viewing side.

Evaluation

The liquid crystal display was placed on the backlight and a contrast ratio was measured at an azimuth angle of 45 degrees relative to an optical axes perpendicular to each other of the polarizing plates and an inclination from a normal direction of 70 degrees to thereby obtain a contrast ratio of 50. Measurement of the contrast ratio was conducted using EZ Contrast (manufactured by ELDIM).

Example 2

Optical Film

A polycarbonate film was stretched to obtain a retardation film having a thickness of 46 μm, an in-plane retardation $Re_2$ of 140 nm and Nz of 0.3. The retardation film and the polarizing plate used in example 1 were laminated one on the other with a pressure sensitive adhesive so that an slow axis of the retardation film and an absorption axis of the polarizing plate were perpendicular to each other to thereby prepare an optical film.

Liquid Crystal Display

A liquid crystal cell in IPS mode with a retardation value of 280 nm at 550 nm was employed and the optical film was, as shown in FIG. 2, laminated onto one side of the liquid crystal cell in IPS mode with a pressure sensitive adhesive so that the retardation film side of the optical film face a surface of the liquid crystal cell in IPS mode on the viewing side. On the other hand, the polarizing plate was laminated onto the surface of the other side of the liquid crystal cell with a pressure sensitive adhesive to thereby prepare a liquid crystal display. Lamination was conducted so that the absorption axis of the polarizing plate (the optical film) on the light incidence side and an extraordinary index direction of a liquid crystal in the liquid crystal cell were parallel to each other. A slow axis of the retardation film (the optical film) was parallel to the absorption axis of the polarizing plate on the light incidence side. The absorption axis of the polarizing plate (the optical film) on the viewing side was perpendicular to the absorption axis of the polarizing plate on the light incidence side.

Evaluation

The liquid crystal display was placed on the backlight and a contrast ratio was measured at an azimuth angle of 45 degrees relative to an optical axes perpendicular to each other of the polarizing plates and an inclination from a normal direction of 70 degrees to thereby obtain a contrast ratio of 45.

Example 3

Preparation of Polarizing Plate

Triacetyl cellulose (TAC) films (transparent protective films with a thickness of 40 μm) were laminated onto respective both surfaces of films (a polarizer with a thickness of 20 μm) obtained by stretching a polyvinyl alcohol film to which iodine had been adsorbed, using an adhesive. A TAC film has an in-plane retardation $Re_1$ of 1 nm and a thickness direction retardation Rth of 38 nm.

Optical Film

A polycarbonate film was stretched to thereby obtain a retardation film ($X_1$) having a thickness of 50 μm, an in-plane retardation $Re_2$ of 120 nm and Nz of 0.5. Another polycarbonate film was stretched to thereby obtain a retardation film ($Y_1$) having a thickness of 48 μm, an in-plane retardation $Re_2$ of 240 nm and Nz of 0.5. The retardation films ($X_1$) and ($Y_1$) were laminated onto the respective polarizing plates with a pressure sensitive adhesive so that the slow axes of the retardation films ($X_1$) and ($Y_1$) were parallel with the absorption axes of the respective polarizing plates to thereby prepare optical films ($X_1$) and ($Y_1$).

Liquid Crystal Display

A liquid crystal cell in IPS mode having a retardation value of 300 nm at 550 nm was adopted and the optical film ($X_1$) was, as shown in FIG. 4, laminated onto the liquid crystal cell in IPS mode with a pressure sensitive adhesive so that the retardation film ($X_1$) side of the optical film ($X_1$) face one surface of the liquid crystal cell in IPS mode on the light incidence side thereof. On the other hand, the optical film ($Y_1$) was laminated onto the liquid crystal cell in IPS mode with a pressure sensitive adhesive so that the retardation film ($Y_1$) side of the optical film ($Y_1$) face the other surface of the liquid crystal cell in IPS mode to thereby prepare a liquid crystal display. In this case, lamination was conducted so that the absorption axis of the polarizing plate of the optical film ($X_1$) on the light incidence side was parallel to an extraordinary index direction that a liquid crystal in the liquid crystal cell has. Lamination was conducted so that the absorption axis of the polarizing plate of the optical film ($X_1$) on the light incidence side was perpendicular to the absorption axis of the polarizing plate of the optical film ($Y_1$) on the viewing side.

Evaluation

The liquid crystal display was placed on the backlight and a contrast ratio was measured at an azimuth angle of 45 degrees relative to an optical axes perpendicular to each other of the polarizing plates and an inclination from a normal direction of 70 degrees to thereby obtain a contrast ratio of 45.

Example 4

Optical Film

A polycarbonate film was stretched to thereby obtain a retardation film ($X_2$) having a thickness of 80 μm, an in-plane retardation $Re_2$ of 80 nm and Nz of 0.5. Another polycarbonate film was stretched to thereby obtain a retardation film ($Y_2$) having a thickness of 48 μm, an in-plane retardation $Re_2$ of 240 nm and Nz of 0.5. The retardation films ($X_2$) and ($Y_2$) were laminated onto the respective polarizing plates prepared in example 3 with a pressure sensitive adhesive so that the slow axes of the retardation films ($X_2$) and ($Y_2$) were parallel with the absorption axes of the respective polarizing plates to thereby prepare optical films ($X_2$) and ($Y_2$).

Liquid Crystal Display

A liquid crystal cell in IPS mode having a retardation value of 300 nm at 550 nm was adopted and the optical film ($X_2$) was, as shown in FIG. 4, laminated onto the liquid crystal cell in IPS mode with a pressure sensitive adhesive so that the retardation film ($X_2$) side of the optical film ($X_2$) face one surface of the liquid crystal cell in IPS mode on the light incidence side thereof. On the other hand, the optical film ($Y_2$) was laminated onto the liquid crystal cell in IPS mode with a pressure sensitive adhesive so that the retardation film ($Y_2$) side of the optical film ($Y_2$) face the other surface of the liquid crystal cell in IPS mode to thereby prepare a liquid crystal display. In this case, lamination was conducted so that the absorption axis of the polarizing plate of the optical film ($X_2$) on the light incidence side was parallel to an extraordinary index direction that a liquid crystal in the liquid crystal cell has. Lamination was conducted so that the absorption axis of the polarizing plate of the optical film ($X_2$) on the light incidence side was perpendicular to the absorption axis of the polarizing plate of the optical film ($Y_2$) on the viewing side.

Evaluation

The liquid crystal display was placed on the backlight and a contrast ratio was measured at an azimuth angle of 45 degrees relative to an optical axes perpendicular to each other of the polarizing plates and an inclination from a normal direction of 70 degrees to thereby obtain a contrast ratio of 55.

Example 5

Optical Film

A polycarbonate film was stretched to thereby obtain a retardation film ($X_3$) having a thickness of 50 μm, an in-plane retardation $Re_2$ of 90 nm and Nz of 0.1. Another polycarbonate film was stretched to thereby obtain a retardation film ($Y_3$) having a thickness of 48 μm, an in-plane retardation $Re_2$ of 240 nm and Nz of 0.5. The retardation films ($X_3$) and ($Y_3$) were laminated onto the respective polarizing plates prepared in example 3 with a pressure sensitive adhesive so that the slow axes of the retardation films ($X_3$) and ($Y_3$) were parallel with the absorption axes of the respective polarizing plates to thereby prepare optical films ($X_3$) and ($Y_3$).

Liquid Crystal Display

A liquid crystal cell in IPS mode having a retardation value of 300 nm at 550 nm was adopted and the optical film ($X_3$) was, as shown in FIG. 4, laminated onto the liquid crystal cell in IPS mode with a pressure sensitive adhesive so that the retardation film ($X_3$) side of the optical film ($X_3$) face one surface of the liquid crystal cell in IPS mode on the light incidence side thereof. On the other hand, the optical film ($Y_3$) was laminated onto the liquid crystal cell in IPS mode with a pressure sensitive adhesive so that the retardation film ($Y_3$) side of the optical film ($Y_3$) face the other surface of the liquid crystal cell in IPS mode to thereby prepare a liquid crystal display. In this case, lamination was conducted so that the absorption axis of the polarizing plate of the optical film ($X_3$) on the light incidence side was parallel to an extraordinary index direction that a liquid crystal in the liquid crystal cell has. Lamination was conducted so that the absorption axis of the polarizing plate of the optical film ($X_3$) on the light incidence side was perpendicular to the absorption axis of the polarizing plate of the optical film ($Y_3$) on the viewing side.

Evaluation

The liquid crystal display was placed on the backlight and a contrast ratio was measured at an azimuth angle of 45 degrees relative to an optical axes perpendicular to each other of the polarizing plates and an inclination from a normal direction of 70 degrees to thereby obtain a contrast ratio of 50.

Comparative Example 1

Liquid Crystal Display

The polarizing plates prepared in Example 1 were laminated onto respective both sides of a liquid crystal cell in IPS mode used in Example 1 with a pressure sensitive adhesive to thereby prepare a liquid crystal display. In this case, the absorption axes of the polarizing plates disposed on both sides of the liquid crystal cell were disposed so as to be perpendicular to each other.

Evaluation

The liquid crystal display was placed on the backlight and a contrast ratio was measured at an azimuth angle of 45 degrees relative to an optical axes perpendicular to each other of the polarizing plates and an inclination from a normal direction of 70 degrees to thereby obtain a contrast ratio of 10.

Comparative Example 2

Optical Film

A polycarbonate film was stretched to thereby obtain a retardation film having a thickness of 50 μm, an in-plane retardation of $Re_2$ of 140 nm and Nz of 1. The retardation film and the polarizing plate prepared in Example 1 were laminated one on the other using a pressure sensitive adhesive so that the slow axis of the retardation film and the absorption axis of the polarizing plate were perpendicular to each other to thereby prepare an optical film.

Liquid Crystal Display

A liquid crystal display was prepared in a similar way to that in Example 1 with the exception that the optical film prepared in the above procedure was adopted instead of the optical film in Example 1.

Evaluation

The liquid crystal display was placed on the backlight and a contrast ratio was measured at an azimuth angle of 45 degrees relative to an optical axes perpendicular to each other of the polarizing plates and an inclination from a normal direction of 70 degrees to thereby obtain a contrast ratio of 11.

INDUSTRIAL APPLICABILITY

The invention is useful as an optical film and the optical film is suited for use in a liquid crystal display driving in IPS mode, and especially for use in a transmissive liquid crystal display.

The invention claimed is:

1. An optical film for a liquid crystal display obtained by laminating a polarizing plate and a retardation film so that an absorption axis of the polarizing plate and a slow axis of the retardation film are perpendicular or parallel to each other, wherein the optical film is applied to an IPS mode liquid crystal display comprising a liquid crystal cell driven in IPS mode, wherein the polarizing plate comprises a transparent protective film on both surfaces of a polarizer and if a direction on the transparent protective film in which an in-plane refractive index is maximized is X axis, a direction perpendicular to X axis is Y axis, a direction of the film thickness is Z axis; and refractive indexes at 550 nm in the respective axes directions are $nx_1$, $ny_1$ and $nz_1$; and a thickness of the film is $d_1$ (nm) by definition, an in-plane retardation $Re_1=(nx_1-ny_1)\times d_1$ is 10 nm or less and a thickness direction retardation $Rth=\{(nx_1+ny_1)/2-nz_1\}\times d_1$ is in the range of from 30 nm to 100 nm, and wherein if a direction on the retardation film in which an in-plane refractive index is maximized is X axis, a direction perpendicular to X axis is Y axis, a direction perpendicular to X axis is Y axis, a direction of the film thickness is Z axis; and refractive indexes at 550 nm in the respective axes directions are $nx_2$, $ny_2$ and $nz_2$; and a thickness of the film is $d_2$ (nm) by definition, the following relations are satisfied:

an Nz value represented by $Nz=(nx_2-nz_2)/(nx_2-ny_2)$ is in the range of from 0.25 to 0.8 and an in-plane retardation $Re_2=(nx_2-ny_2)\times d_2$ is in the range of from 60 to 300 nm.

2. The optical film according to claim 1, wherein the liquid crystal cell driven in IPS mode is a liquid crystal cell in IPS mode having a retardation value in the range of from 230 to 360 nm at 550 nm when no voltage is applied.

3. A transmissive liquid crystal display comprising: a liquid crystal cell containing a pair of substrates between which a liquid crystal layer is sandwiched, and driven in IPS mode; and a pair of polarizing plates disposed on both sides of the liquid crystal cells so that an absorption axis of the polarizing plates are perpendicular to each other, wherein at least one of the polarizing plates is an optical film according to claim 2, and the optical film is disposed so that an retardation film sides face the liquid crystal cell.

4. The transmissive liquid crystal display according to claim 3, wherein the optical film is disposed on a cell substrate on the viewing side, and an extraordinary refractive index direction of a liquid crystal material in the liquid crystal cell when no voltage is applied and an absorption axis of the polarizing plate on the light incidence side are parallel to each other.

5. The transmissive liquid crystal display according to claim 4, wherein the optical film comprises a polarizing plate and a retardation film so that an absorption axis of the polarizing plate and a slow axis of the retardation film are perpendicular to each other.

6. The transmissive liquid crystal display according to claim 3, wherein the optical film is disposed on a cell substrate on the light incidence side, and an extraordinary index direction of a liquid crystal material in the liquid crystal cell when no voltage is applied and an absorption axis of the polarizing plate in the optical film are perpendicular to each other.

7. The transmissive liquid crystal display according to claim 6, wherein the optical film comprises a polarizing plate and a retardation film so that an absorption axis of the polarizing plate and a slow axis of the retardation film are perpendicular to each other.

8. The transmissive liquid crystal display according to claim 6, wherein an in-plane retardation $Re_2$ of the retardation film in the optical film disposed on the cell substrate on the light incidence side is smaller than an in-plane retardation $Re_2$ of the retardation film in the optical film disposed on the cell substrate on the viewing side.

9. The transmissive liquid crystal display according to claim 3, wherein the optical film are disposed on a cell substrate on the viewing side and the light incidence side, and an extraordinary index direction of a liquid crystal material in the liquid crystal cell when no voltage is applied and an absorption axis of the polarizing plate in the optical film on the light incidence side are parallel to each other.

10. The transmissive liquid crystal display according to claim 9, wherein the optical film comprises a polarizing plate and a retardation film so that an absorption axis of the polarizing plate and a slow axis of the retardation film are parallel to each other.

11. The transmissive liquid crystal display according to claim 9, wherein an in-plane retardation $Re_2$ of the retardation film in the optical film disposed on the cell substrate on the light incidence side is smaller than an in-plane retardation $Re_2$ of the retardation film in the optical film disposed on the cell substrate on the viewing side.

12. A transmissive liquid crystal display comprising: a liquid crystal cell containing a pair of substrates between which a liquid crystal layer is sandwiched, and driven in IPS mode; and a pair of polarizing plates disposed on both sides of the liquid crystal cells so that an absorption axis of the polarizing plates are perpendicular to each other, wherein at least one of the polarizing plates is an optical film according to claim 1, and the optical film is disposed so that an retardation film sides face the liquid crystal cell.

13. The transmissive liquid crystal display according to claim 12, wherein the optical film is disposed on a cell substrate on the viewing side, and an extraordinary refractive index direction of a liquid crystal material in the liquid crystal cell when no voltage is applied and an absorption axis of the polarizing plate on the light incidence side are parallel to each other.

14. The transmissive liquid crystal display according to claim 13, wherein the optical film comprises a polarizing plate and a retardation film so that an absorption axis of the polarizing plate and a slow axis of the retardation film are perpendicular to each other.

15. The transmissive liquid crystal display according to claim 12, wherein the optical film is disposed on a cell substrate on the light incidence side, and an extraordinary index direction of a liquid crystal material in the liquid crystal cell when no voltage is applied and an absorption axis of the polarizing plate in the optical film are perpendicular to each other.

16. The transmissive liquid crystal display according to claim 15, wherein the optical film comprises a polarizing plate and a retardation film so that an absorption axis of the polarizing plate and a slow axis of the retardation film are perpendicular to each other.

17. The transmissive liquid crystal display according to claim 12, wherein the optical film are disposed on a cell substrate on the viewing side and the light incidence side, and an extraordinary index direction of a liquid crystal material in the liquid crystal cell when no voltage is applied and an absorption axis of the polarizing plate in the optical film on the light incidence side are parallel to each other.

18. The transmissive liquid crystal display according to claim 17, wherein the optical film comprises a polarizing plate and a retardation film so that an absorption axis of the polarizing plate and a slow axis of the retardation film are parallel to each other.

19. The transmissive liquid crystal display according to claim 18, wherein an in-plane retardation $Re_2$ of the retardation film in the optical film disposed on the cell substrate on the light incidence side is smaller than an in-plane retardation $Re_2$ of the retardation film in the optical film disposed on the cell substrate on the viewing side.

20. The transmissive liquid crystal display according to claim 17, wherein an in-plane retardation $Re_2$ of the retardation film in the optical film disposed on the cell substrate on the light incidence side is smaller than an in-plane retardation $Re_2$ of the retardation film in the optical film disposed on the cell substrate on the viewing side.

* * * * *